United States Patent
Kirkpatrick

[11] Patent Number: 6,050,614
[45] Date of Patent: Apr. 18, 2000

[54] BOLTED SEAL JOINT ASSEMBLY

[75] Inventor: Ralph A. Kirkpatrick, Cincinnati, Ohio

[73] Assignee: General Electric Company, Cincinnati, Ohio

[21] Appl. No.: 08/767,929

[22] Filed: Dec. 17, 1996

[51] Int. Cl.[7] ................................................. F16L 23/12
[52] U.S. Cl. ........................ 285/368; 285/414; 285/189; 123/469
[58] Field of Search ................................. 285/363, 414, 285/139.1, 368, 219, 220, 207, 189; 123/468, 469, 41.01

[56] References Cited

U.S. PATENT DOCUMENTS

| | | |
|---|---|---|
| 1,090,970 | 3/1914 | Butler . |
| 1,233,170 | 7/1917 | Berry .................................. 285/414 X |
| 2,072,893 | 3/1937 | Lee ...................................... 285/363 X |
| 2,653,834 | 9/1953 | Purkhiser ............................. 285/363 X |
| 2,900,199 | 8/1959 | Logan .................................. 285/363 X |
| 3,235,291 | 2/1966 | Jacoby . |
| 3,515,416 | 6/1970 | Pickert . |
| 4,288,105 | 9/1981 | Press .................................... 285/363 X |
| 4,458,926 | 7/1984 | Williamson . |
| 5,437,482 | 8/1995 | Curtis .................................. 285/363 X |

Primary Examiner—H. Shackelford
Attorney, Agent, or Firm—Andrew C. Hess; Rodney M. Young

[57] ABSTRACT

A swivel flange seal joint assembly which includes a tube having an integral, enlarged ferrule and swivel flange is described. The ferrule is enlarged and includes oversized fastener openings configured to allow circumferential alignment between the swivel flange and openings in a mating surface. The assembly also includes a gasket having openings, and the gasket is positioned between the ferrule and the mating surface so that a seal is formed between when the fasteners which extend through the flange, ferrule, gasket and mating surface openings are tightened.

8 Claims, 2 Drawing Sheets

BOLTED SEAL JOINT ASSEMBLY

FIELD OF THE INVENTION

This invention relates generally to gas turbine engines and more particularly, to bolted seal joints for fluid lines used, for example, in connection with aircraft engines.

BACKGROUND OF THE INVENTION

In high pressure applications such as for fluid lines in an aircraft engine, fixed flange and swivel flange bolted face seal joints are commonly utilized to secure the fluid line. For example, in an aircraft engine, a fluid line typically extends to a port in the engine, and the line is secured to the engine at the location of the port so that fluid can flow through the line and into the engine. Providing a tight and secure fit between the fluid line and the engine clearly is important. Any leaks or other failures of the joint between the engine and the fluid line are highly undesirable.

In a known seal joint configuration, threaded fasteners (e.g., bolt plus a nut or an insert) around the periphery of the seal provide a distributed clamp force to resist fluid pressure that could separate the line from the engine and cause a leak. The number of fasteners and type of seal selected depend upon particular operating conditions.

With a fixed flange configuration, a flange is integral with the fluid line. Openings in the flange are aligned with openings in the engine outer surface, and bolts are inserted into respective aligned openings and tightened. A gasket typically is positioned between the flange and the engine so that a seal is formed between the flange and engine. If the fluid line cannot be easily twisted or bent, since the flange is fixed to the fluid line, it is necessary that the flange and flange openings be fabricated with very limited tolerances so that the proper alignment between the flange and the engine can be provided. Of course, manufacturing a flange and flange openings with very limited tolerances can be a cumbersome and time consuming process.

With a swivel flange configuration, a ferrule integral with the fluid line is provided, and the fluid line extends through a separate mating flange having openings to mate with openings in the engine. The mating flange is rotatable relative to the fluid line and is easily aligned with the bolt openings in the mating component, e.g., an aircraft engine.

Common applications for swivel flanges are high pressure hoses, which can fail if twisted to provide alignment, and rigid tubes, which commonly cannot be manufactured to the tolerance required for flange alignment. In both applications, the ferrule can mate with the seal surface in any circumferential orientation favorable to the fluid line and the swivel flange can then be rotated as required to align the bolt openings.

With a swivel flange, however, a gap at the fastener clamp load path is required to ensure that the clamping force is effective on the seal surface. Without a gap, none of the clamp force is transmitted to the seal and the ferrule can lift off under pressure. With a gap, all the clamp force is transmitted across the seal, but a bending load is placed on the fastener, e.g., bolt. Such a bending load is undesirable because such a load causes a concentrated stress much higher than the nominal clamp stress. Cyclic loading (pressure variations or external loads from the fluid line) has a significant effect on the fastener stress and could result in premature fatigue of the fasteners.

It would be desirable to provide a bolted seal joint assembly including a swivel flange which eliminates a need for fabricating tubes with fixed flanges having limited tolerances yet does not require a gap in the fastener load path to transmit all the clamp force across the seal. It also would be desirable to provide such a bolted seal joint assembly which does not have more components and is not significantly more expensive, in terms of both labor and material, than known swivel flange bolted seal joint assemblies.

SUMMARY OF THE INVENTION

These and other objects may be attained by a swivel flange seal joint assembly which maintains all the benefits of the swivel flange assembly while ensuring a structurally sound clamp force load path with no gap and no resultant fastener bending. In one embodiment, the assembly includes a tube having an integral ferrule and swivel flange. The ferrule is enlarged and includes oversized fastener openings configured to allow circumferential alignment between the swivel flange and openings in a mating surface. The assembly also includes a gasket having openings, and the gasket is positioned between the ferrule and the mating surface so that a seal is formed between when the fasteners which extend through the flange, ferrule, gasket and mating surface openings are tightened.

With assembly, there is no gap in the load path and all the clamping forces of the fasteners are transmitted to the seal surfaces. In addition, since the swivel flange can be easily rotated relative to the tube and the ferrule, circumferential alignment between openings in the flange and openings in the seal surface can be easily and readily performed, without requiring tight manufacturing tolerances.

DETAILED DESCRIPTION OF THE DRAWINGS

Figure 1A:
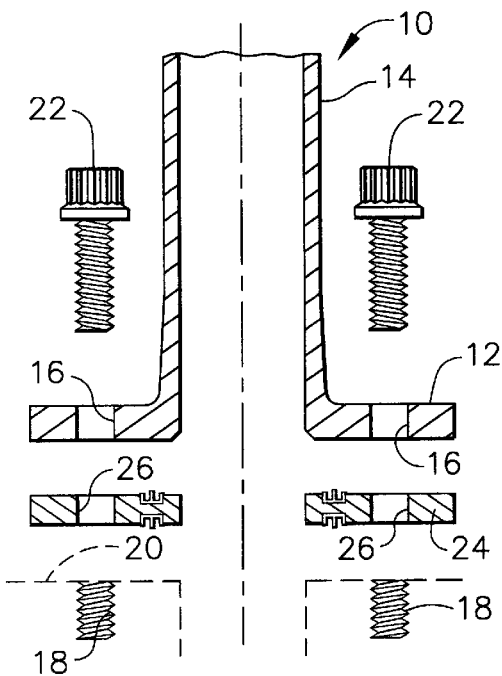
FIGS. 1A and 1B are cross-sectional and perspective views of a known fixed flange seal joint assembly.
Figure 1B:
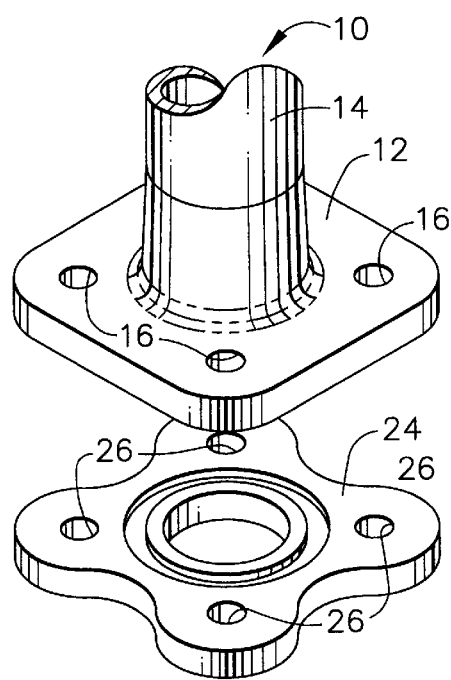

FIGS. 1A and 1B are cross-sectional and perspective views of a known fixed flange seal joint assembly 10. Specifically, a flange 12 is integral with fluid line 14. Openings 16 in flange 12 are positioned to align with openings 18 in a mating surface 20, e.g., a surface of an aircraft engine, and fasteners 22, e.g., bolts, are inserted into respective aligned openings 16 and 20 and tightened. A gasket 24 having openings 26 typically is positioned between flange 12 and mating surface 20 so that a seal is formed between flange 12 and surface 20.

If fluid line 14 cannot be easily twisted or bent, since flange 12 is fixed to fluid line 14, it is necessary that flange 12 and flange openings 16 be fabricated with very limited tolerances so that the proper alignment between flange 12 and mating surface 20 can be provided. Of course, manufacturing flange 12 and flange openings 16 with very limited tolerances can be a cumbersome and time consuming process.

Figure 2A:
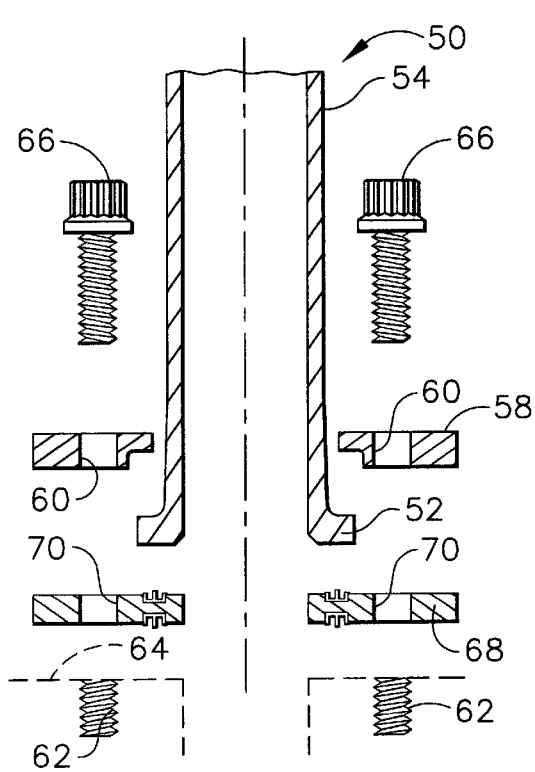
FIGS. 2A and 2B are cross-sectional and perspective views of a known swivel flange seal joint assembly.
Figure 2B:
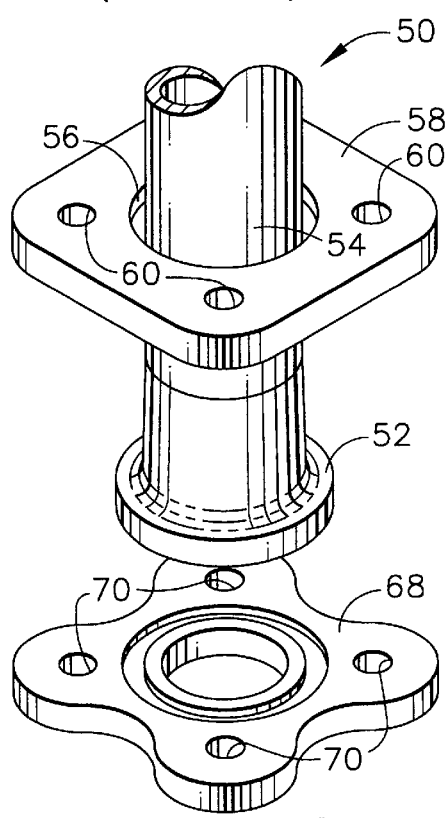

FIGS. 2A and 2B are cross-sectional and perspective views of a known swivel flange seal joint assembly 50. In assembly 50, a ferrule 52 is integral with a fluid line 54.

Fluid line 54 extends through an opening 56 in seperate mating flange 58. Mating flange 58 also includes openings 60 to mate with openings 62 in a mating surface 64. Mating flange 58 is rotatable relative to fluid line 54 and is easily aligned with openings 62 in mating surface 64 so that fasteners 66 can be inserted through aligned openings 60 and 62. A gasket 68 having openings 70 typically is positioned between flange 58 and mating surface 64 so that a seal is formed between flange 58 and surface 64.

Figure 3A:
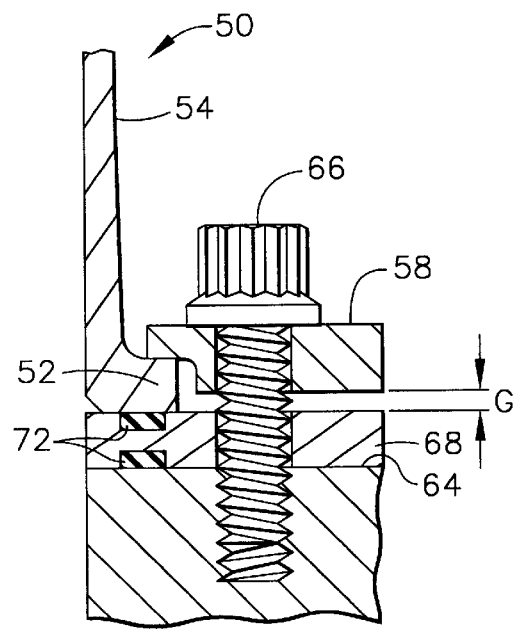
FIGS. 3A and 3B are enlarged views showing the clamping arrangement of the known swivel flange seal joint shown in FIGS. 2A and 2B.
Figure 3B:
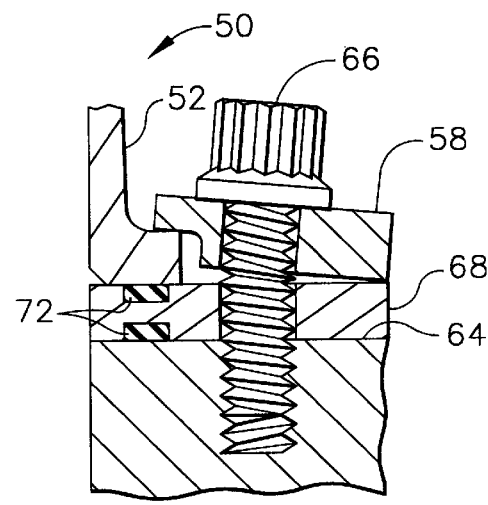

FIGS. 3A and 3B are enlarged views showing the clamping arrangement of swivel flange seal joint assembly 50. Specifically, a gap G at the fastener clamp load path is required to ensure that the clamping force is effective to form a seal between line 54 and surface 64. Without gap G, none of the clamp force is transmitted to seal surfaces 72 and ferrule 52 can lift off under pressure. Specifically, internal fluid pressure within line 54 creates an external force, or pressure. Without gap G, ferrule 52 can possibly lift off gasket 68 which, of course, is undesirable.

With gap G, all the clamp force is transmitted across seal surfaces 72, but a bending load is placed on fastener 66 as illustrated in FIG. 3B. Such a bending load is undesirable because such a load causes a concentrated stress much higher than the nominal clamp stress. Cyclic loading (pressure variations or external loads from fluid line) has a significant effect on the fastener stress and could result in premature fatigue of fasteners 66.

Figure 4A:
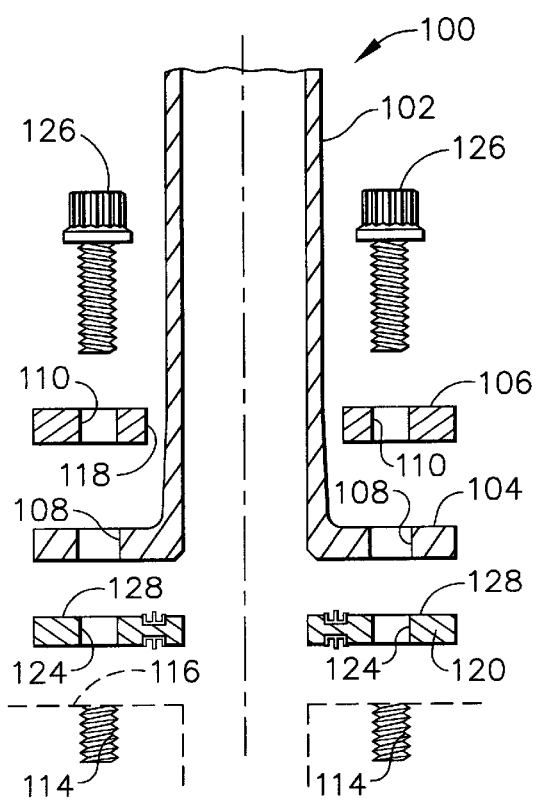
FIGS. 4A and 4B are cross-sectional and perspective views of a swivel flange seal joint assembly in accordance with one embodiment of the present invention.
Figure 4B:
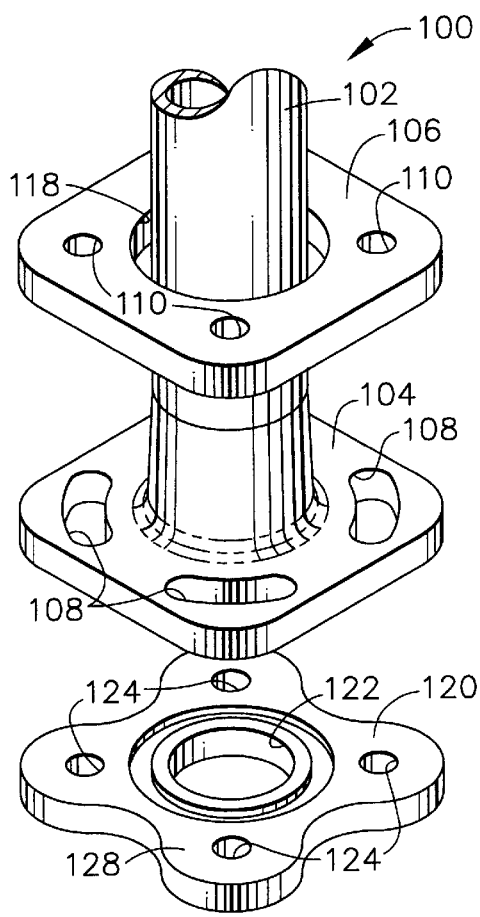

FIGS. 4A and 4B are cross-sectional and perspective views of a swivel flange seal joint assembly 100 in accordance with one embodiment of the present invention. Assembly 100 maintains all the benefits of the known swivel flange assemblies while ensuring a structurally sound clamp force load path with no gap and no resultant fastener bending.

Specifically, assembly 100 includes a tube 102 having an integral ferrule 104, and a separate swivel flange 106. Ferrule 104 is enlarged and includes oversized fastener openings 108 configured to allow circumferential alignment between fastener openings 110 in swivel flange 106 and openings 114 in a mating surface 116. Rather than oversized openings 108, elongate slots can be located (e.g., machined) in ferrule 104. The specific dimensions of ferrule 104 and flange 106 are, of course, a function of the application requirements. Swivel flange 106 includes a center opening 118, and tube 102 (or fluid line) extends through center opening 118. Assembly 100 also includes a gasket 120 having a center opening 122 and fastener openings 124. Gasket 120 is positioned between ferrule 104 and mating surface 116 so that a seal is formed between flange 106 and surface 116 when fasteners 126 which extend through flange, ferrule, gasket and mating surface openings 110, 108, 124 and 114 are tightened.

Tube 102 and ferrule 104 can, for example, be fabricated from 321 stainless steel, inconel 625 or titanium. Swivel flange 106 can, for example, be fabricated from stainless steel.

With assembly 100, there is no gap in the load path and all the clamping forces of fasteners 126 are transmitted to seal surfaces 128. Specifically, swivel flange 106 is in substantial surface to surface contact with ferrule 104, and as fasteners 126 are tightened, flange 106 is tightened against ferrule 104 without bending forces being placed on fasteners 126. In addition, since swivel flange 106 can be easily rotated relative to tube 102 and ferrule 104, circumferential alignment between openings 110 in flange 106 and openings 114 in seal surface 116 can be easily and readily performed, without requiring tight manufacturing tolerances.

In the illustrated configuration, four openings are located in flange 106, ferrule 104, gasket 120 and mating surface 116. Rather than four openings, configurations having two, three, or more openings could, for example, be used. In addition, rather than a gasket, radial plug-in 0-ring joints as well as face seals and special molded seals can be used.

Assembly 100 eliminates a need for fabricating tubes with fixed flanges having limited tolerances yet does not require a gap in the fastener load path to transmit all the clamp force across the seal. Assembly 100 also does not have more components and is not significantly more expensive, in terms of both labor and material, than known swivel flange bolted seal joint assemblies.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A swivel flange seal joint assembly connected to an engine, the engine having a mating surface and a plurality of threaded fastener openings, comprising:

a swivel flange comprising a center opening and a plurality of fastener openings therein;

said tube comprising an enlarged ferrule at one end, a plurality of fastener slots in said ferrule configured so that said flange fastener openings can be aligned with said ferrule fastener slots and the threaded openings in the engine, said ferrule fastener slots oversized with respect to said swivel flange fastener openings, said tube configured to extend through said swivel flance center opening;

a gasket configured to be located adjacent said ferrule; and a plurality of threaded fasteners configured to extend through said swivel flange fastener openings, said ferrule fastener slots, and into the threaded openings in the engine.

2. A swivel flange seal joint assembly in accordance with claim 1 wherein said swivel flange is sized to be in substantial surface to surface contact with said ferrule.

3. A swivel flange seal joint assembly in accordance with claim 1 wherein said ferrule fastener slots are elongated circumferential slots.

4. A swivel flange seal joint assembly in accordance with claim 1 wherein said gasket includes a center opening and a plurality of fastener openings.

5. A swivel flange seal joint assembly in accordance with claim 1 further comprising a plurality of fasteners, each of said fasteners configured to extend through respective aligned openings in said swivel flange and said ferrule.

6. A swivel flange seal joint assembly connected to an engine, the engine having a mating surface and a plurality of threaded fastener openings, said assembly comprising:

a swivel flange comprising a center opening and a plurality of fastener openings therein;

a tube comprising an enlarged ferrule at one end and a plurality of fastener slots in said ferrule oversized with respect to said swivel flange fastener openings, said tube configured to extend through said swivel flange center opening; and a plurality of threaded fasteners configured to extend through said swivel flange fastener openings. and configured to be tightened without any substantial bending forces on said fasteners, said ferrule fastener slots configured so that said swivel flange fastener openings can be aligned with said ferrule fastener slots and said fasteners can extend through said ferrule fastener slots and into the threaded openings in the engine.

7. A swivel flange seal joint assembly in accordance with claim 6 wherein said swivel flange is sized to be in substantial surface to surface contact with said ferrule.

8. A swivel flange seal joint assembly connected to an engine, the engine having a mating surface and a plurality of threaded fastener openings, comprising:

a swivel flange comprising a center opening and a plurality of fastener openings therein;

said tube comprising an enlaroed ferrule at one end and a plurality of fastener slots in said ferrule oversized with respect to said swivel flange fastener openings, said tube configured to extend through said swivel flange center opening;

a plurality of threaded fasteners configured to extend through said swivel flange fastener openings, said ferrule fastener slots and into the threaded openings in the engine, said fasteners configured to be tightened without any substantial bending forces on said fasteners; and a gasket having a center opening and a plurality of fastener openings, said gasket configured to be located between said ferrule and a mating surface.

* * * * *